Sept. 13, 1960
H. C. BEHRENS ET AL
2,952,266
DIRECT CURRENT MEASURING APPARATUS
Filed Aug. 7, 1958
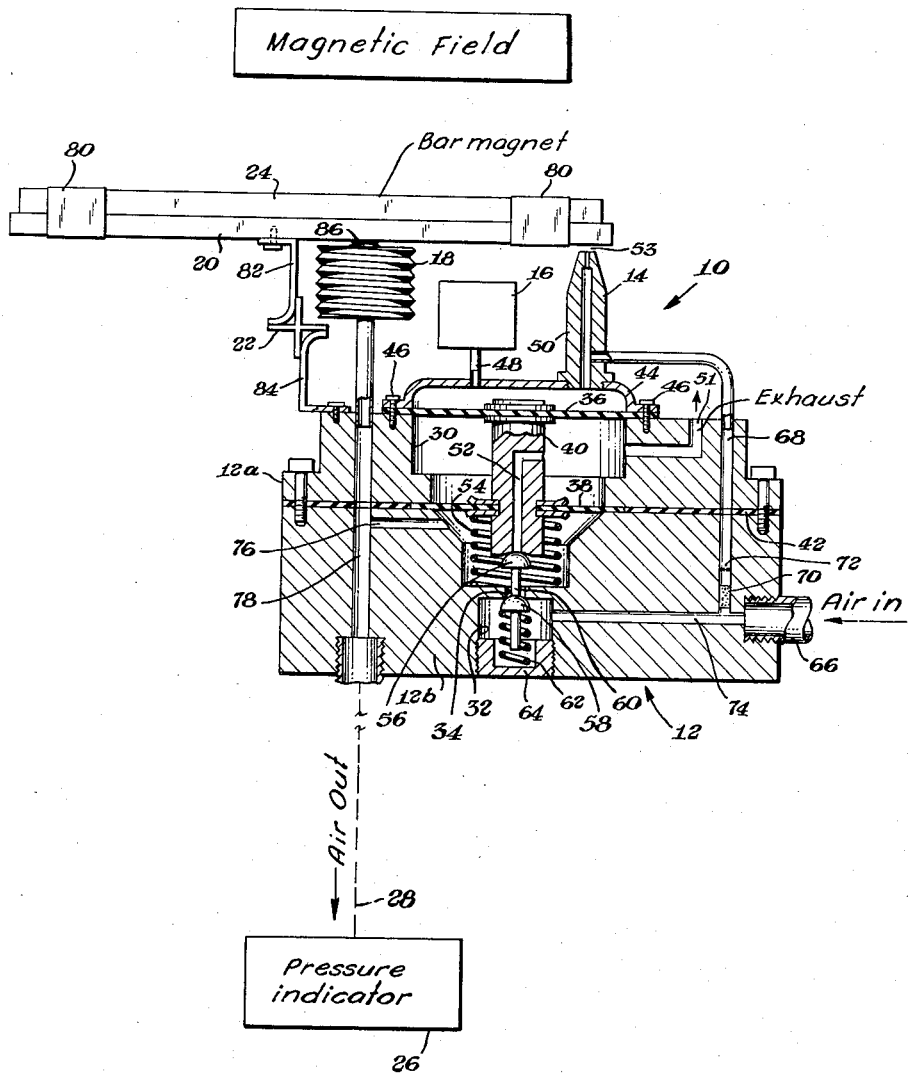
INVENTORS.
Hugh C. Behrens
BY Jesse T. Vick, Jr.
Earl D. Ayers
AGENT United States Patent Office 2,952,266
Patented Sept. 13, 1960

2,952,266

DIRECT CURRENT MEASURING APPARATUS

Hugh C. Behrens, Angleton, and Jesse T. Vick, Jr., Lake Jackson, Tex., assignors to The Dow Chemical Company, Midland, Mich., a corporation of Delaware Filed Aug. 7, 1958, Ser. No. 753,761

7 Claims. (Cl. 137—85)

This invention relates to apparatus for measuring direct electrical current and particularly to apparatus which is adapted to measure very large direct electrical currents.

The need for a more accurate means of measuring direct currents of the order of many thousands of amperes has long been known. The use of a shunt (and a millivolt meter connected across the shunt) is suitable for the measurement, with reliable accuracy, of currents of up to 5,000 or 10,000 amperes, but for currents of the order of 100,000 amperes reliable shunts are not available at present. Also, even at the 5,000 or 10,000 ampere current level variations in atmospheric conditions or temperature changes of the shunt cause small changes in the resistance across the shunts used in such current measurements and therefore reliability is not assured between successive current measurements.

In the past because of the unavailability of suitable shunts it has been found advisable to use the available, more reliable lower current shunts to measure the current in individual feeder buss bars rather than measure at one time the current present in a main buss bar.

Accordingly, a principal object of this invention is to provide an improved, more reliable means for measuring very large electrical currents.

Another object of this invention is to provide an improved, more reliable direct current measuring device which may be used to provide remote indication of current and which need not be electrically connected to the current carrying conductor.

In accordance with this invention there is provided a pneumatic converter in the form of a null force balancing system in which a pivoted beam or vane adjacent to a gas nozzle is influenced by a magnetic field to restrict the flow of gas through the nozzle as a function of the strength of the magnetic field. The output pressure of the pneumatic converter is a function of the rate of air flow through the nozzle and therefore is a function of the magnetic field strength (which is proportional to the current in a nearby conductor).

The invention, as well as additional objects and advantages thereof, will best be understood when the following detailed description is read in connection with the single figure of the drawing which is a simplified view, partly in section, of current measuring apparatus made in accordance with this invention.

Referring to the drawing there is shown pneumatic converter apparatus, indicated generally by the numeral 10, comprising a block-like body part 12, a nozzle 14, a capacity tank 16, a bellows 18, a weighing beam 20 coupled to the body by crossed spring pivot means 22, a permanent magnet 24 and an indicator 26 coupled to the gas (air) output line 28 of the apparatus.

The body 12 includes a large upper bore 30 having stepped walls extending into said body, a bore 32 having threaded side walls extending into the body from the lower side thereof, and a bore 34 connecting the upper bore 30 and lower bore 32. The bores 30, 32 and 34, as shown, are axially aligned with respect to one another. A pair of diaphragms 36, 38 extend across the upper bore 30. A cylindrical block 40, sealed to and carried by the diaphragms 36 and 38, extends between and through each of the diaphragms. The body 12 is made in sections 12a, 12b, the section line between the upper section 12a and lower section 12b being generally along the same plane as the plane of the diaphragm 38 which, with a gasket 42, is clamped between the body sections. The diaphragm 36 (the upper diaphragm) is sealed between the edges of a somewhat hat-shaped cover plate 44 and the top of the body part 12a by means of the bolts 46. A gas tight capacity tank 16 is coupled through the cover plate 44 by means of a hollow tube 48. The nozzle 14, which contains an axial bore 50 having a restriction 53 at the nozzle output end, is secured to the cover plate 44 with the bore 50 communicating with the space between the diaphragm 36 and cover plate 44.

A passageway 51 extends between that part of the wall of the bore 30 which lies between the two diaphragms 36, 38 and the outer surface of the body 12. Another passageway 52 extends from the bottom of the cylindrical block 40 through the block 40 and opening into the open space between the diaphragms 36, 38.

A coil spring 54 extends between the lower end of the bore 30 and the lower side of the diaphragm 38, the spring being coaxial with respect to the block 40. A pair of valves 56, 58 are disposed along a rod 60, the spacing between the valves 56, 58 being such that, when the diaphragm 38 is in its rest or "normal" position, as when the device isn't in operation, for example, the valve 58 seats against and closes the aperture 34 at its lower end and the valve 56 seats against and closes the lower end of the passageway 52. A spring 62, surrounding the lower part of the rod 60 and held in place by sealing plug 64, exerts an upwardly directed force on the valves 56, 48. The body 12 has an air input terminal 66 which communicates with a passageway and tube 68 which extends to the bore 50 in the nozzle 14. A filter 70 and restriction 72 are disposed in the passageway 68, preventing the passage of harmful particles into the nozzle 14 and somewhat restricting the volumetric flow of gas through the nozzle 14. The air input terminal 66 also communicates with a passageway 74 which opens into the bore 34.

A passageway 76 also extends from the wall of the bore 30 which lies between the lower diaphragm 38 and the bore 34 to a passageway and tube 78 which extends between the bellows 18 and the lower end of the body 12.

The weighing beam 20 has, as previously mentioned, a permanent magnet 24 in the form of a rod secured thereto by means of mounting straps or clamps 80. The beam 20 is supported by and is fixedly connected to a rigid support element 82 which is coupled to the spring pivot 22. The spring pivot 22 is fixedly secured to the mounting bracket 84 which is attached rigidly to the body 12.

As mounted, the weighing bar 20 is so aligned that, when the beam is balanced to provide normal nozzle back pressure, one end of the beam 20 is disposed above the nozzle 14 with the bottom surface of the beam perpendicular with respect to the longitudinal axis of the nozzle bore 50.

The bellows 18 is so disposed that an increase in air pressure through the passage and tube 78 will expand the bellows and (with suitable expansion) raise the coupling member 86 in contact with the lower side of the weighing beam and thus raise the beam 20.

In operation the apparatus 10 is disposed near to a linear section of buss bar which carries a heavy current with the bar magnet 24 axially aligned 90 degrees with respect to the direction of the lines of force of the magnetic field surrounding the buss bar. Since the torque on a permanent straight bar magnet varies with the sine of the angle between the longitudinal axis of the magnet and the direction of the lines of force of the magnetic field, the 90 degree alignment above described provides maximum current sensitivity (maximum torque on magnet 24) with little or no error due to minute angular changes in the magnet-field relationship. The magnetic field surrounding the buss bar (not shown) tends to exert more or less torque on the weighing beam, the amount of torque being a function of the current flow in the buss bar.

Let it be assumed that the alignment of the weighing beam and magnet is such that an increase in torque on the weighing beam tends to unbalance the beam and bring the weighing beam closer to the output end of the nozzle 14. (Total movement of the weighing beam to and from the nozzle is a few thousandths of an inch. In one such device, beam movement was only .002 inch).

Under the above conditions and assuming that a constant pressure of air is fed into the device 10, as the beam approaches the upper or output end of the nozzle 14, nozzle back pressure is increased. The increase in nozzle back pressure causes the diaphragms 36, 38 and block 40 to be depressed downwardly, opening the valve 58. When the valve 58 opens, air in the bore 32 (connected with the air inlet tube 66 by means of passageway 74) passes through the bore 34 and passageways 76 and 78 to increase the pressure on the bellows 18 and raise the weighing beam to relieve the excess back pressure and also cause an increase in output pressure to appear on indicator 26. When the excess back pressure is relieved, the diaphragms 36 and 38 return to their flat configuration, drawing up the block 40 and closing the valve 58.

If, on the other hand, the weighing beam 20 is forced upwardly with respect to the nozzle 14 by torque exerted on the magnet 24, nozzle back pressure will decrease, causing the diaphragms 36, 38 and the block 40 to move upwardly (as they are spring loaded by spring 54 and also due to the now greater pressure on diaphragm 38 than is on diaphragm 36), opening the valve 56 and exhausting air to the atmosphere (through passageways 51 and 52) from the bellows 18, the space between the bore 34 and the diaphragm 36 and the passageways 76 and 78 until the weighing beam is pulled back towards the nozzle 14 by the bellows 18 (as air is released therefrom). The diaphragms 36 and 38 become flat again when the nozzle back pressure returns to normal and the valve 56 is closed, shutting off the flow of air to the exhaust passageway 51.

Thus, the device 10 operates to maintain the weighing beam 20 at a balanced position, the output pressure being that pressure which is maintained in the passageway 78 which communicates with the bellows 18. Since minor variations in back pressure result in a change in output pressure, the capacity tank 16, communicating with the volume between the cap 44 and diaphragm 36, provides a larger air volume which must undergo pressure changes before the diaphragm 36 flexes, thus acting as a sort of damping device to prevent undue "hunting" or oscillating of the device due to minute and momentary changes in nozzle back pressure. Although the reading on the indicator 26 indicates output pressure, the output pressure is a function of the torque on the magnet 24 which in turn is a function of the current in the nearby buss bar (not shown). The indicator may, therefore, be directly calibrated in current values.

When the apparatus is installed near a buss bar carrying a large electrical current, the apparatus may be positioned so that the torque (and variations in the torque) on the magnet 24 produce changes in nozzle back pressure which are within the operating range of the apparatus. The output of the apparatus, so positioned and properly oriented with respect to the magnetic field, may then be calibrated on the pressure indicator. It should be noted that all of the device except the bar magnet 24 preferably should be made of non-magnetic materials.

We claim:

1. Apparatus for indirectly measuring large direct electrical currents in a conductor having substantially uniform magnetic field distribution along at least part of its length, comprising a block-like body part having ends, side walls and three axially aligned bores, said bores being, in comparison with one another, of large, intermediate and small diameter, the large diameter bore extending into the body part from one end thereof, the intermediate diameter bore extending into the body part from the other end thereof, the small diameter bore extending between and communicating with the large diameter bore and intermediate diameter bore, a pair of flexible, substantially gas impervious diaphragms, one of said diaphragms being sealed across one end of said body and covering said large diameter bore, the other of said diaphragms being disposed across and sealing said large diameter bore between the diaphragm at the end of the body part and the small diameter bore, an elongated block having an upper end, a lower end and sides, said block extending through both of said diaphragms and being sealed thereto, the block having a passageway extending from the lower end thereof and communicating with the side wall of the block in the space between the two diaphragms, means for spring loading said block, a pair of valves disposed along a common rod, means for spring loading said valves, one of said valves being disposed adjacent to and seatable against the lower end of the small diameter bore, the other of said valves being disposed adjacent to and seatable against the passageway in the block at the lower end thereof, means for closing the lower end of the intermediate bore, a cap, said cap being made of gas impervious material and disposed at the end of the body communicating with the large diameter bore, said cap covering the opening of the large diameter bore, a nozzle, said nozzle being coupled to said cap and having a passageway extending therethrough, a gas inlet, said inlet being pneumatically coupled to said intermediate diameter bore and with the passageway in said nozzle, an elongated weighing beam, means mechanically secured to said body for pivotally supporting said weighing beam substantially at its balance point and adjacent to said nozzle, an end part of said beam being disposed over said nozzle, said weighing beam having a rod-like bar magnet secured thereto, a single compartment bellows, said bellows being directly mechanically coupled to said weighing bar and said body part and pneumatically coupled to said large diameter bore between said small diameter bore and the diaphragm closest to the small diameter bore, a pressure responsive device, said device being pneumatically coupled to said bellows, and a vent passageway extending from the part of the large diameter bore which is between the diaphragms to the surface of the body part.

2. Apparatus in accordance with claim 1, wherein said bar magnet is axially disposed with respect to said weighing beam.

3. Apparatus in accordance with claim 1, wherein said bar magnet is magnetic and the remainder of the apparatus is non-magnetic..

4. Apparatus in accordance with claim 1, wherein filter means are provided in the pneumatic coupling between the nozzle and the gas inlet.

5. Apparatus in accordance with claim 1, wherein nozzle passageway has a restriction at its output end.

6. Apparatus in accordance with claim 1, wherein pneumatic damping means are coupled through said cap.

7. Apparatus in accordance with claim 1, wherein said weighing beam is so pivotally disposed that it is in line with an extension of the nozzle passageway at all times during operation.

References Cited in the file of this patent

UNITED STATES PATENTS

| | | |
|---|---|---|
| 1,171,213 | Knopp | Feb. 8, 1916 |
| 2,089,083 | Arey | Aug. 3, 1937 |
| 2,638,921 | Caldwell | May 19, 1953 |
| 2,658,392 | Vannah | Nov. 10, 1953 |